(12) United States Patent
Rohde et al.

(10) Patent No.: US 8,769,494 B2
(45) Date of Patent: Jul. 1, 2014

(54) GLOBALLY SOUND AND CONSISTENT CONFIGURATION MANAGEMENT FOR DISTRIBUTED DATACENTER COMPONENTS

(75) Inventors: Henning Rohde, Renton, WA (US); Matthew Kerner, Seattle, WA (US); Kenneth Kai-Baun Ma, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 12/967,794

(22) Filed: Dec. 14, 2010

(65) Prior Publication Data

US 2012/0151443 A1 Jun. 14, 2012

(51) Int. Cl.
*G06F 9/44* (2006.01)
*G06F 9/445* (2006.01)
*G06F 9/46* (2006.01)
*G06F 9/30* (2006.01)
*G06F 9/38* (2006.01)

(52) U.S. Cl.
CPC .. *G06F 9/44* (2013.01); *G06F 8/71* (2013.01); *G06F 9/445* (2013.01); *G06F 9/46* (2013.01); *G06F 9/38* (2013.01); *G06F 9/30* (2013.01)
USPC .......................................... 717/121; 707/100

(58) Field of Classification Search
CPC ............. G06F 9/44; G06F 9/445; G06F 9/46; G06F 9/38; G06F 9/30; G06F 8/71
USPC .......................................... 717/121; 707/100
See application file for complete search history.

(56) References Cited

U.S. PATENT DOCUMENTS

| | | | |
|---|---|---|---|
| 6,704,737 B1 * | 3/2004 | Nixon et al. | ................... 707/656 |
| 7,103,874 B2 | 9/2006 | McCollum et al. | |
| 7,162,509 B2 | 1/2007 | Brown et al. | |
| 2002/0073180 A1 * | 6/2002 | Dewhurst et al. | ............. 709/220 |
| 2008/0301081 A1 * | 12/2008 | Karnik et al. | ................... 706/48 |
| 2009/0172704 A1 | 7/2009 | Ingle et al. | |
| 2010/0017419 A1 | 1/2010 | Francis et al. | |

OTHER PUBLICATIONS

Veritas™ Configuration Manager—Application and Server, Symantec Corporation, Published 2006 http://eval.symantec.com/mktginfo/enterprise/fact_sheets/configuration_manager_datasheet.pdf.

EMC Ionix for Data Center Automation and Compliance, Published 2009 http://www.emc.com/collateral/software/solution-overview/h6415-ionix-data-center-so.pdf.

(Continued)

*Primary Examiner* — Chat Do
*Assistant Examiner* — Lynda Dinh
(74) *Attorney, Agent, or Firm* — David Andrews; Ben Tabor; Micky Minhas

(57) ABSTRACT

Datacenter configuration needs to be managed. A configuration engine (CE) manages configuration data of clusters and/or datacenters. The CE allows users to check out, edit, and check in configuration components. Versioned interfaces are placed between configuration components through data contracts. The CE supports the expression of constraints that ensure global consistency across configuration components and versions, isolates changes in the datacenter from structural changes in configuration components, and enables partial configuration branching to allow for active snapshots that enable configuration rollback. The CE ensures that types are consistent and constraints are satisfied at check-in time to eliminate unsound or inconsistent configuration in the first place. When the active configuration in the datacenter changes, multiple versions of configuration may be simultaneously deployed for a window of time. The managed set of configuration is permitted to have multiple active versions during these transitional windows to reflect the reality in the datacenter.

17 Claims, 12 Drawing Sheets

(56) References Cited

OTHER PUBLICATIONS

Bhargavan, Karthikeyan et al., Getting Operations Logic Right Types, Service-Orientation, and Static Analysis, Retrieved Jul. 15, 2010 http://research.microsoft.com/en-us/um/people/adg/Publications/tol-r2d2.pdf.

Battala, Rajesh, Disaster Recovery Planning | Data Center Disaster Recovery using Novell PlateSpin Products, Published Apr. 14, 2010 http://www.novell.com/communities/node/11298/disaster-recovery-planning-data-.

* cited by examiner

GLOBALLY SOUND AND CONSISTENT CONFIGURATION MANAGEMENT FOR DISTRIBUTED DATACENTER COMPONENTS

SUMMARY

In a first aspect, a set of computer-useable instructions provide a method of updating a datacenter configuration. The datacenter configuration is organized into configuration components that are globally consistent. A developer wishes to change configuration data for a component. The developer downloads a copy of the active set of configurations and makes the desired changes. A modified version of the configuration component is received from the developer. A determination is made as to whether the modified configuration component is globally consistent with a committed version of the datacenter configuration. The modified configuration component is accepted into a managed set of datacenter configuration when it is consistent and is rejected when it is not consistent. For more advanced operations, a developer can perform changes within a partial branch of configuration data before the changes are merged back into the main branch. When the active configuration in the datacenter changes, multiple versions of configuration may be simultaneously deployed for a window of time. The managed set of configuration is permitted to have multiple active versions during these transitional windows to reflect the reality in the datacenter.

BRIEF DESCRIPTION OF THE SEVERAL VIEWS OF THE DRAWINGS

Some illustrative embodiments of the present invention are described in detail below with reference to the attached drawing figures, and wherein.

DETAILED DESCRIPTION

The subject matter of some embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Our technology may take the form of, among other things: a method, system, or set of instructions embodied on one or more computer-readable media. Computer-readable media include both volatile and nonvolatile media, removable and nonremovable media, and contemplate media readable by a computing device. Computer-readable media include any that is useable for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
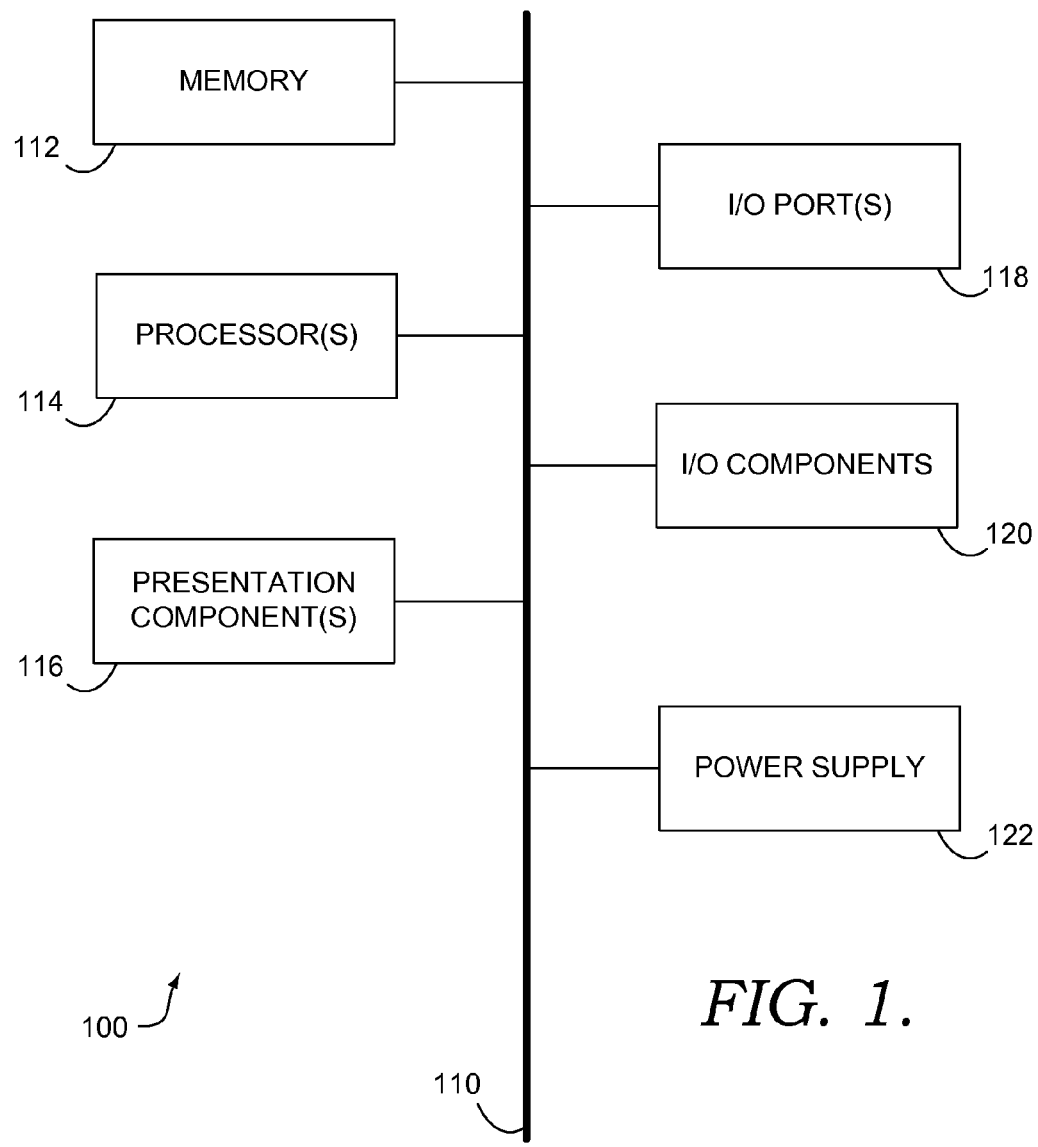
FIG. 1 depicts an exemplary operating environment in accordance with an embodiment of the present invention.

Referring initially to FIG. 1 in particular, an exemplary operating environment for implementing an embodiment of the present invention is shown and designated generally as computing device 100. Computing device 100 is but one example of a suitable computing environment.

An embodiment of the invention may be described in the general context of computer code or machine-useable instructions, including computer-executable instructions such as program modules, embodied on computer-readable media, being executed by a computer or other machine, such as a personal data assistant or other handheld device. Generally, program modules including routines, programs, objects, components, data structures, etc., refer to code that perform particular tasks or implement particular abstract data types. An embodiment of the invention may be practiced in a variety of system configurations, including handheld devices, consumer electronics, general-purpose computers, more specialty computing devices, etc. An embodiment of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Large-scale networked systems are commonplace systems employed in a variety of settings for running applications and maintaining data for business and operational functions and may be referred to as datacenters. A datacenter may provide a variety of services (e.g., web applications, email services, search engine services, among others). These large-scale networked systems typically include a large number of nodes distributed throughout the datacenter, in which each node resembles a physical machine or a virtual machine running on a physical host.

Figure 2:
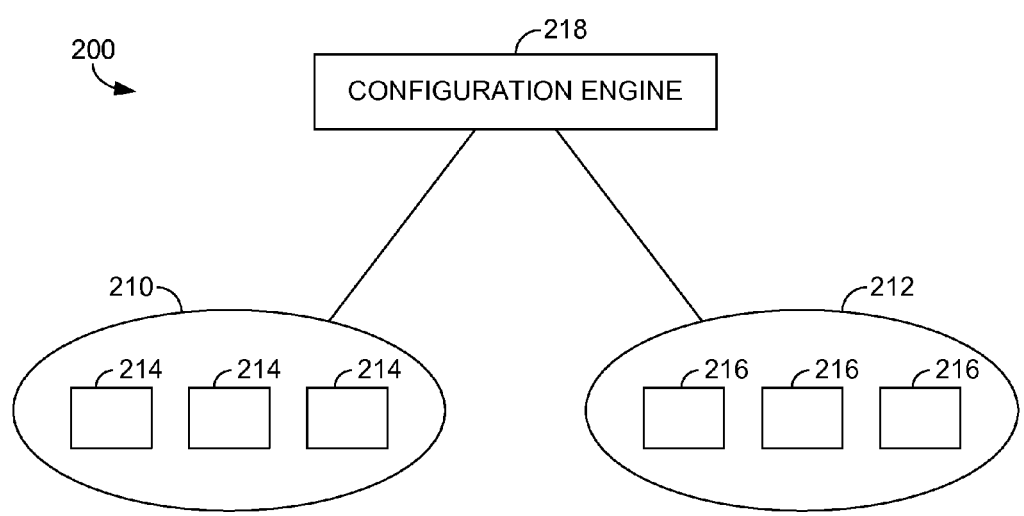
FIG. 2 depicts an exemplary operating environment in accordance with an embodiment of the present invention.

Referring now to FIG. 2, an exemplary operating environment for implementing an embodiment of the present invention is shown and designated generally as environment 200. Environment 200 is but one example of a suitable operating environment.

Environment 200 includes a cluster 210 and a cluster 212. In an embodiment, a cluster is a group of independent computers or servers that operate as if they are a single unit. Cluster 210 includes multiple servers 214 and cluster 212 includes multiple servers 216. In one embodiment, environment 200 may include multiple clusters. In another embodiment, environment 200 may include a single cluster. In an embodiment, the number of clusters in environment 200 may change over time. Although clusters 210 and 212 are depicted as including multiple servers, in some embodiments either or both clusters 210 and 212 may each include only a single server.

In an embodiment, cluster 210 and cluster 212 reside at the same geographical location. In another embodiment, cluster 210 and cluster 212 are geographically separated.

A datacenter is a large-scale networked system typically employed running applications and maintaining data for business and operational functions. A datacenter may provide a variety of services (e.g., web applications, email services, search engine services, etc.) for a plurality of customers simultaneously. These large-scale networked systems typically include a large number of resources distributed throughout the datacenter, with many physical machines linked together by physical network equipment such as routers, switches and load balancers, as well as virtual machines that are hosted on the physical machines. When the datacenter hosts multiple tenants (e.g., customer programs), these resources are optimally allocated from the same datacenter to the different tenants.

A datacenter may include one or more clusters. In an embodiment, cluster 210 may constitute a first datacenter 210, and cluster 212 may constitute another datacenter 212. In another embodiment, cluster 210 and cluster 212 may together constitute a datacenter, even though cluster 210 and cluster 212 may be geographically separated.

A datacenter, such as datacenters 210 and 212, requires a wide range of configuration that needs to be managed. The configuration describes the physical and logical resources, the set of associated systems that need to interact in order to manage the datacenter, and the policies that should be enforced within the datacenter. As the size of a datacenter and the functionality within it grows, the set of required configuration grows, spanning multiple components and formats, involving many varied configuration artifacts (e.g., files containing values for configuration settings).

Providing uniformity across policies and artifacts for different classes of datacenter assets (e.g., test, preproduction, and production) reduces complexity and risk by simplifying the task of determining what other components will be affected whenever the configuration functionality of a configuration artifact is augmented or changed. Defining settings and values in a consistent way across varied configuration artifacts facilitates aspect-oriented configuration audits (e.g., audits of global security policies).

Providing consistent formats across configuration artifacts minimizes the need for domain expertise when reviewing configuration and/or conducting a global configuration review. As configuration settings change, it is important to manage the flow of those changes from a developer-specific test environment, to a team-wide test environment, to preproduction and production. It is also important to prevent the inadvertent propagation of changes to subsequent environments too soon, which would potentially introduce the risk of untested configuration causing a problem, or deployment of a new version of configuration that is incompatible with older deployed configuration.

On the other hand, failure to propagate changes results in the usage of stale configuration or old versions of configuration that cannot be consumed by newer deployed assets. If multiple teams are making changes to configuration artifacts, a snapshot of the artifacts at a moment in time may provide inconsistent data. As configuration artifacts are consumed from multiple locations, the risk of mistaken or malicious alteration or deletion of those artifacts increases. Inconsistent configuration can be deployed across multiple datacenter resources, leaving time windows where components cannot function correctly.

When configuration is continually revised and deployed, it is beneficial to track associated pairing between versions, making it possible to reliably roll back datacenter software to a previous known good state in a decoupled environment (either to mitigate problems in newer versions or to replicate old environments for investigation).

With further reference to FIG. 2, a configuration engine 218 manages the configuration data of clusters 210 and 212. In some embodiments, configuration engine 218 manages multiple clusters while in others it manages only a single cluster. Configuration engine 218 may manage a single datacenter of multiple datacenters. Configuration engine 218 may reside on a server, on a collection of servers, or on other types of network devices. Configuration engine 218 may be located at a specific facility, or may be distributed over a wider geographic area. Configuration engine 218 allows users to check out, edit, and check in configuration values, organized in so-called configuration components. It also allows users or other programs to query for configuration values.

Configuration engine 218 supports the expression of constraints that ensure global consistency across configuration components and versions, isolates changes in the datacenter from structural changes in configuration components, and enables partial configuration branching to allow for active snapshots that enable configuration rollback. For example, these constraints could prevent multiple fabric clusters from each listing the same node in their inventories. Some global constraints are fairly simple (e.g., if clusters are associated in replicated pairs for disaster recovery, then the partner cluster associated with each element of the pair must be the opposite element of the pair). The configuration engine also allows for transitional ambiguity (i.e., simultaneous implementation of different versions during transition) to enable strict environmental reconciliation even during non-atomic rollouts.

The configuration engine 218 ensures that types are consistent and constraints are satisfied at check-in time to eliminate the possibility of unsound or inconsistent configuration existing in the system in the first place. It allows for an orchestrated commit (i.e., a coordinated update) across configuration components with potentially different owners to apply these rules across global as well as component-local constraints. Configuration data that is checked in, or present in configuration engine 218, but is not actually in the datacenter is referred to as "committed," whereas "deployed" refers to what is actually in use in the datacenter.

Figure 3:
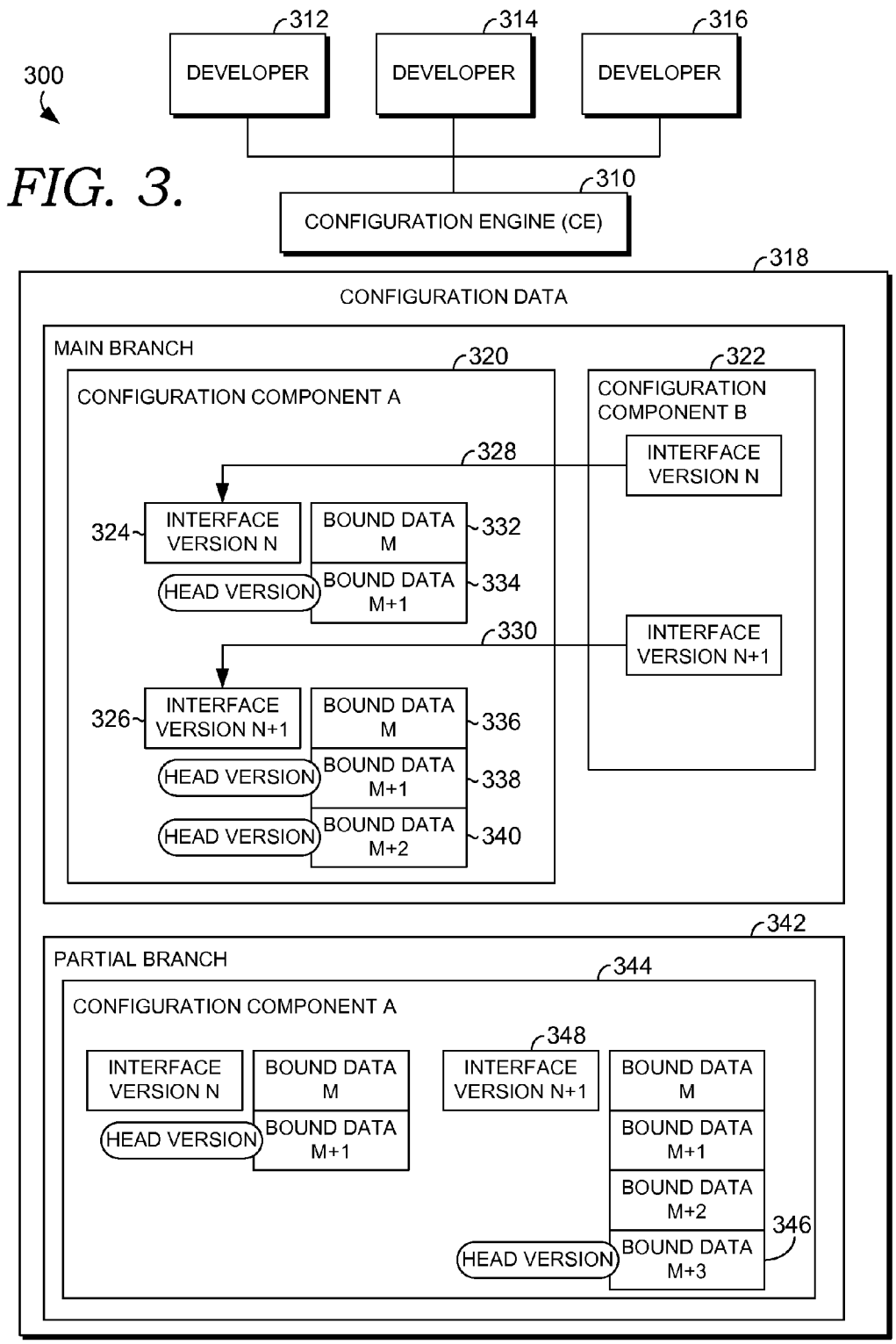
FIG. 3 depicts an exemplary configuration management environment in accordance with an embodiment of the present invention.

Referring now to FIG. 3, an exemplary configuration management environment for use in an embodiment of the present invention is shown and designated generally as configuration management environment 300. Configuration management environment 300 is but one example of a suitable configuration management environment.

A configuration engine 310 is accessed by multiple developers 312, 314, and 316. In an embodiment, configuration engine 310 manages a set of configuration data 318 and performs the functions described above. Configuration data 318 may include configuration settings for one or more clusters and one or more datacenters. Developers 312, 314, and 316 may be engineers, technicians, and other persons who are responsible for maintaining and updating configuration data 318 for a datacenter and/or different datacenters. For example, in an embodiment developer 312 maintains a portion of configuration data 318 that is relevant to a first datacenter, while developer 314 maintains a portion of configuration data 318 that is relevant to a different datacenter.

Configuration engine 310 allows configuration owners (e.g., developers 312, 314 and 316) to factor configuration data 318 into separate, aspect-oriented configuration components, such as a component A 320 and a component B 322. A configuration component is a collection of configuration data that corresponds to a distinct aspect of configuration, such as physical assets, logical assets, billing policies, security policies, per-component policies, and other aspects of datacenter configuration. This separation clarifies ownership and reduces the complexity to be considered when an owner makes a change. A primary change by an owner is isolated to the component's aspect. Any rippling effect is evaluated and approved by those impacted, and components that are not impacted are literally not updated and thus not accidentally changed.

Versioned interfaces are placed between configuration components through data contracts. For example, as depicted in FIG. 3, component A 320 includes an interface version N 324 and an interface version N+1 326. Interface version N+1 326 is the most current interface version. The versioned interfaces describe the named, typed settings that consumers of a particular configuration component can query for. Producers (e.g., developers) do not impact consumers when they make an interface change because consumers migrate to newer interface versions at their own pace. Producers retire old interface versions over time once all consumers have migrated to new versions.

The configuration data bound to an interface is also versioned. The use of typed settings enables consistency checking at the time that the data is supplied, or checked in, to configuration engine 310, rather than the time that the data is consumed during deployment. This enables early detection of configuration problems. The use of versioned configuration data eliminates the timing and synchronization issues when changes are made by multiple developers. Consumers of configuration can retrieve the correct, versioned data whenever they want it.

A feature of the interfaces is that the data bound can be represented in a way that is independent of how it is queried. In particular, it can be much more compact and thus be much easier to review and in turn ensure is correct. In particular, configuration engine 310 allows a variety of options, such as using inheritance, conditionals, or default values for a compact human-reviewable definition. By way of example, an aspect of configuration may define billing rates between datacenters. An interface may specify:

$$DC \times DC \rightarrow rate,$$

i.e., provide two datacenter names (e.g., DCA, DCB, DCC, or DCD) and get back the rate, which is easy to query. One possible definition is a table:

|     | DCA | DCB | DCC | DCD |
| --- | --- | --- | --- | --- |
| DCA | 0   | 4   | 4   | 7   |
| DCB | 4   | 0   | 4   | 7   |
| DCC | 4   | 4   | 0   | 7   |
| DCD | 7   | 7   | 7   | 0   |

The table specifies the rate for any two datacenters, but is difficult for humans to review because the rules it encodes are implicit and the table may become very large. An example of a clearer, more compact definition based on conditionals and default values is provided with C-like syntax (note that inheritance is not illustrated in this particular example, and note that other representations such as XML may be used):

```
Function (DC a, DC b)
{
    if (a == b) // Datacenters are identical
        return 0;
    if (a == "DCD" or b == "DCD") // One of the datacenters is DCD
        return 7;
    return 4; // Default for all other cases
}
```

This definition is less error prone and easier to extend when a new datacenter is added.

Configuration components may also contain multiple exact versions of data that are bound to an interface version. This allows values to change across exact versions, as long as the data bound as each exact version is consistent with the interface (and global constraints). As depicted in FIG. 3, interface version N 324 includes bound data M 332 and bound data M+1 334. An interface version and a bound exact version constitute a two-level versioning scheme.

Component B 322 illustrates two-level versioning with explicit versioned dependencies. As depicted, configuration component B 322 is dependent on interface version N 324 and interface version N+1 326 of configuration component A 320. This is indicated by arrows 328 and 330, respectively (the arrows indicate dependency, not a flow of data). As such, component B 322 takes an explicit dependency on component A 320, meaning that the data bound to component B 322 depends on component A 320's interface types or data, for example by including an embedded query to configuration component A 320.

Configuration engine 310 ensures that queries are well formed at check-in time and ensures that global constraints and the types across the upstream components are consistent. In other words, a user cannot bind a new exact version unless the types of the values that it returns for every member in the interface are consistent with the interface declaration. It also ensures that the data bound to the exact version is consistent with global constraints. Implementing two-level versioning with explicit versioned dependencies that are validated by the system at check-in time enables well-defined exact versions to be retrieved. An example of an implicit constraint is that the same properties across interface versions must have the same values (i.e., if the property "CompA.PropertyA" has a value of "one," then the value "one" must be returned no matter what version of the interface is used to query.)

By making dependencies explicit and versioned through the first level of two-level versioning, component owners can introduce versioned interface changes that can be adopted by consumers at a pace that suits them—this ensures that interface changes do not cause failures in evaluation of dependent components. Since the changes in data bound in exact versions must be consistent with the typing of the interface and global constraints, exact version changes cannot cause failures downstream and thus can occur at any time. Because a constraint (which is part of an exact version) is limited by the dependencies of the interface version of its component, it can only constrain what it can "see". Thus, downstream constraints do not need to be reevaluated because they cannot have changed. This is one benefit of having explicit dependencies.

Because constraints are global, they may affect multiple configuration components. Therefore, in order to make specific global changes, it may be necessary to update multiple configuration components atomically in a single orchestrated commit.

Environmental reconciliation is the process by which a developer or program confirms that the configuration values that are actually deployed match the expected set of configuration values. This is easy when a single configuration version is deployed—it is a straightforward checking process assuming that the expected and actual values can be obtained. However, it is harder to do this strictly when a non-atomic rollout (i.e., an incremental deployment) is in progress—two or more distinct configuration versions may be expected, each with a set of possibly distinct values.

Configuration engine 310 enables strict environmental reconciliation by using a feature called transitional ambiguity. At any given time, a set of exact versions are marked as head versions (i.e., the current, active data bindings against an interface version) in the configuration engine. Each exact version of a component may include constraints that are required to be true. If all constraints of all head exact version of all components in all branches hold, then the configuration data is globally consistent.

There may be zero head versions in an interface, in which case the interface cannot be queried at all. Most commonly, there will be one head version, in which case that version's values are returned during evaluation unless a more specific version is specified by the caller.

Configuration engine 310 supports two or more head exact versions. As depicted in FIG. 3, with reference to component A 320, interface version N 324 has a head version of bound data M+1 334. Interface version N+1 326 includes bound data M 336 and head version bound data M+1 338, which correspond to bound data M 332 and bound data M+1 334, respectively. But interface version N+1 326 also includes bound data M+2 340 as a head version.

When an interface version includes two head versions, configuration engine 310 internally examines the contents of the bound data and returns a set of values at evaluation. When the values are equivalent across head versions, then the single common value is returned. When the values are different across head versions, then the set of distinct possible values is returned.

Since configuration components may depend on each other, this set of distinct possible values is cascaded across components (with collapsing of equal values at each step) until the end result is returned to the caller. The caller is guaranteed that the minimal set of expected values is returned. This enables strict environmental reconciliation (i.e., verification of a minimal set of possible expected values) even during deployments where configuration values are in transition. This would occur in the case of FIG. 3, where component B 322 is dependent on component A 326's interface version N+1 326, which has two head versions.

When a developer wishes to modify one or more configuration components, those components are typically part of a larger set of configuration data. The larger set may be referred to as a main branch, or a parent branch, of configuration data. A developer may select the components to be included in a partial branch, or child branch, which contains copies of the selected components from the parent branch but does not include a copy of the entire set of configuration data.

A partial branch 342 is depicted, which includes a configuration component A 344. In this instance, a developer selected configuration component A320, in the main branch, to be included in partial branch 342. Configuration component A 344 is a copy of configuration component A 320, and includes copies of interface version N 324 and interface version N+1 326, and the versions of bound data for each of those interface versions.

Partial branch 342 inherits the main branch's view of non-branched configuration components, that is, partial branch 342 refers back to the main branch with regard to the other configuration components that are not included in the partial branch. In effect, the components in the partial branch can "see" the other components in the main branch, thus, there is no need to include all of the configuration data of the main branch (also, there is no need to copy the configuration data that models the physical resources of the datacenter). Thus, partial branch 342 enables the developer to modify configuration component A 344 without impacting the configuration components in the main branch, while still maintaining the ability to build and deploy the entire product.

For example, the developer may want to add a new version of bound data for an interface version. As depicted, configuration component A 344 in partial branch 342 has been modified by a developer to include bound data M+3 346, which is a new head version of bound data for interface version N+1 348.

When the modified branched configuration component A 344 is ready, it is integrated (or copied) into the main branch. Configuration engine 310 detects changes made in the meantime in the main branch, and requires developers to understand and resolve these merge conflicts.

Figure 4:
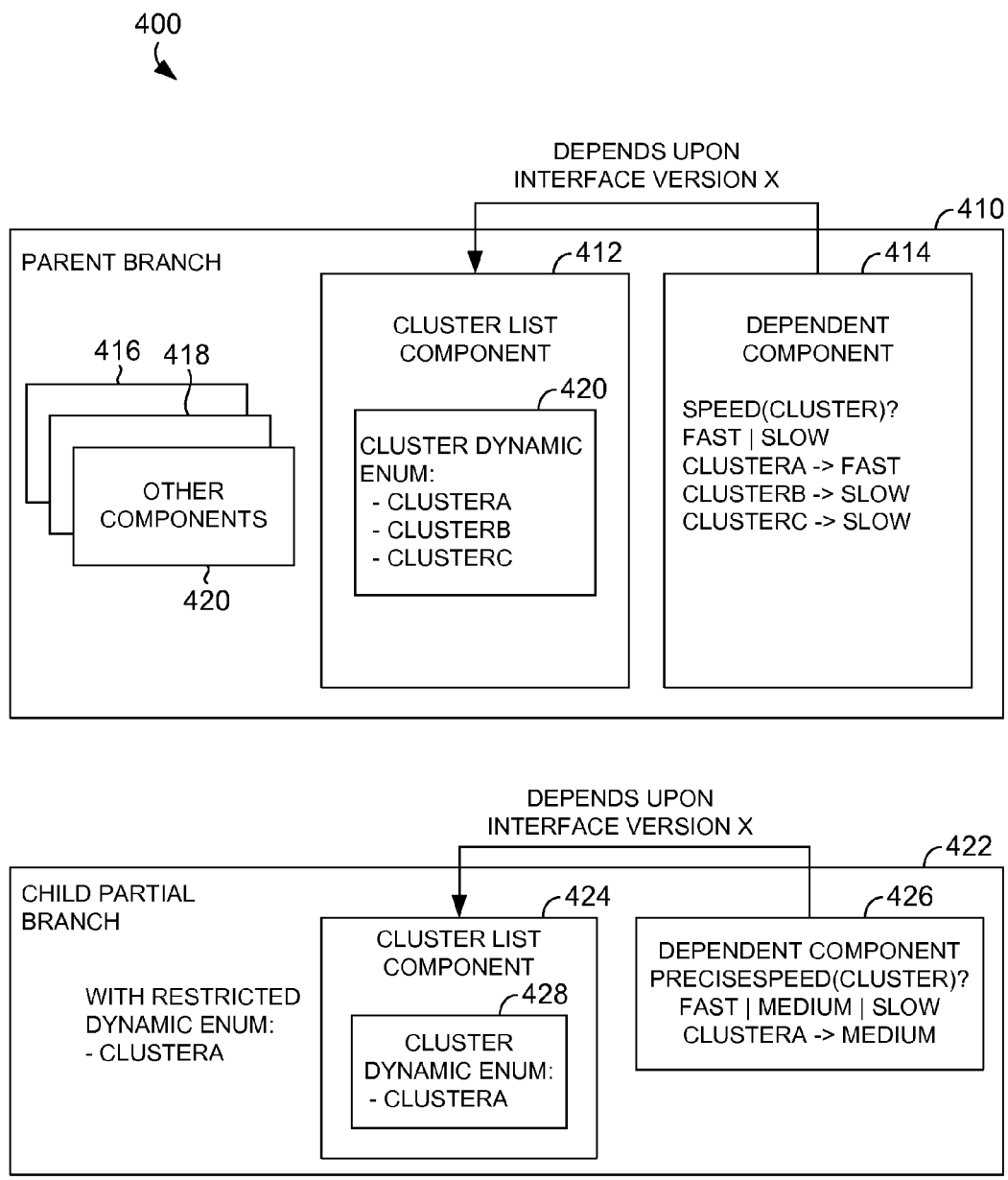
FIG. 4 depicts exemplary configuration data in accordance with an embodiment of the present invention.

Referring now to FIG. 4, exemplary configuration data suitable for use in an embodiment of the present invention is shown and designated generally as configuration data 400. Configuration data 400 is but one example of suitable configuration data.

Referring to FIG. 4, a parent branch 410 is depicted. In one embodiment, parent branch 410 may itself be a portion of a larger branch. In another embodiment, parent branch 410 may be a master branch, or main branch, in which case it includes the configuration data for an entire datacenter or networks that are managed by the configuration engine. Parent branch 410 includes a configuration component ("component") 412, a component 414, and other components 416, 418, and 420.

Component 412 includes a dynamic enum 420. In an embodiment, dynamic enums are one type of constraint that is enforced by configuration engine 310 at check-in time. The dynamic enum type can be associated with a specific member of a configuration component, or with a parameter to a function (or map) within a configuration component. In an embodiment, the dynamic enum type expresses a set of assets such as the set of clusters that exist, such as clusterA, clusterB, and clusterC in dynamic enum 420. In some embodiments, dynamic enums may be lists of datacenters, clusters, special tenants and any other set of assets that are expected to grow or shrink over time as clusters are built and retired. The concept of a dynamic enum is that there is a certain class of things that can be queried about, and membership in that class may change, but it can be declared up front that the selection will always be valid across all members of the class.

The dynamic enum type expresses a finite set of possible values. Additionally, additions or subtractions to that set of possible values are opaque from a type perspective. Because dynamic enums are an opaque type (i.e., the details of the type are hidden), an asset can be configured without requiring changes in component interfaces. This isolates changes in the datacenter (e.g., addition of new assets, removal of old assets) from structural changes in configuration components.

In other words, the contents of a dynamic enum can change without affecting the interface version of its owning component or the bindings of the components that depend upon its owning component. Because the dynamic enum type is opaque, it is possible to grow or shrink the set of assets present in the configuration engine without affecting configuration components that do not depend directly upon the values within the enum.

Component 414 is dependent on an interface version X (not shown) of component 412, in that the queries available to component 414 are defined in interface version X of component 412. In an embodiment, component 414 can query component 412 for whether a given cluster in dynamic enum 420 is fast or slow.

A child partial branch 422 includes components 424 and 426 that are copies of components 412 and 414, respectively, in parent branch 410. Component 426 is modified to query whether a given cluster in dynamic enum 420 is fast, medium, or slow.

Configuration engine 310 of FIG. 3 allows for restriction of dynamic enums in child branches to model configuration flow through decoupled environments. That is, a parent branch might model all assets in a dynamic enum, while a child branch models only a subset of those assets. This enables engineers to design and test configuration changes in the child branch in such a way that all global constraints are declared and enforced, but only for the subset of the assets that exist in the branch. As depicted in FIG. 4, child branch 422 restricts the scope of dynamic enum 428 such that it lists only ClusterA. Some global constraints are fairly simple (e.g., if clusters are associated in replicated pairs for disaster recovery, then the partner cluster associated with each element of the pair must be the opposite element of the pair).

When queries are issued against configuration components in the parent branch from the child branch, the values of dynamic enum parameters are restricted to match the set of values known in the child branch, and the results returned must be present and properly typed for that subset of assets. All global constraints are enforced, except that dynamic enum 424 allows the definition of new configuration settings for clusterA only (i.e., the developer need not populate the new setting with values for every cluster at an early point in the development cycle). In an embodiment, the restriction of a dynamic enum is explicit. Explicit restriction allows verification that the data that is not included in the restricted enum is still in the full enum (as opposed to just ignoring everything outside the restriction), which, among other things, enables typos to be caught more easily.

Thus, the dynamic enum enables global constraints to apply just to the set of clusters in integration, which in turn allows deployment of novel configuration versions in integration before the full set of required values is defined for all production clusters. Dynamic enums enable configuration engine 310 to guarantee that all required configuration has been provisioned for a new instance before that instance can be added to the enum, i.e., all required settings are populated with values when a new asset is added to the datacenter.

For example, this would ensure that every required configuration value for a newly-built cluster has been prepared before the cluster can be put into production. Dynamic enums isolate the cluster and tenant lifecycle from the lifecycle of each component release, while still allowing component owners to declare certain configuration settings as being required per-cluster.

Thus, the developer can independently validate configuration (e.g., the addition of a new certificate), which could well be prohibitively expensive to do up-front for the hundreds of production clusters that might exist in parent branch 410.

As changes are integrated up through parent branches, a new type of merge conflict can be detected (a dynamic enum constraint validation failure) that will have to be corrected as part of the integration by the parent branch owner. In this way, configuration changes that propagate progressively from one decoupled environment to the next can be modeled in the configuration engine, enabling engineers to work efficiently with small sets of assets while still allowing for full guarantees of consistency in production with large numbers of assets.

In addition to ensuring that global constraints are consistent with the components in the parent branch, configuration engine 310 also ensures that global constraints are consistent with the components across all branches. This results in a system where the configuration as checked in to every branch is always valid—any change that would violate this invariant must be corrected, possibly across multiple components and branches as an orchestrated commit. This allows developers to develop new configuration in a child branch without affecting other developers who work off of the parent branch.

As the configuration change is integrated across branches, the dynamic enum grows to cover the clusters represented in each branch, ensuring global consistency independently in separate, decoupled environments. The use of dynamic enums effectively decouples configuration interfaces from asset management.

This also allows a developer to branch a specific set of configuration components, and maintain those components as a kind of active snapshot. That is, the set of configuration components are maintained in a version-specific child branch that must always be consistent with the other components as present in the parent branch. This means that the preserved version can always be deployed to a cluster with the knowledge that it will interoperate in a sound and consistent way with other configuration versions that have moved forward or backward independently. The branched configuration version may have to change slightly, but only to ensure that global constraints are met—not to introduce new features or policies.

Figure 5:
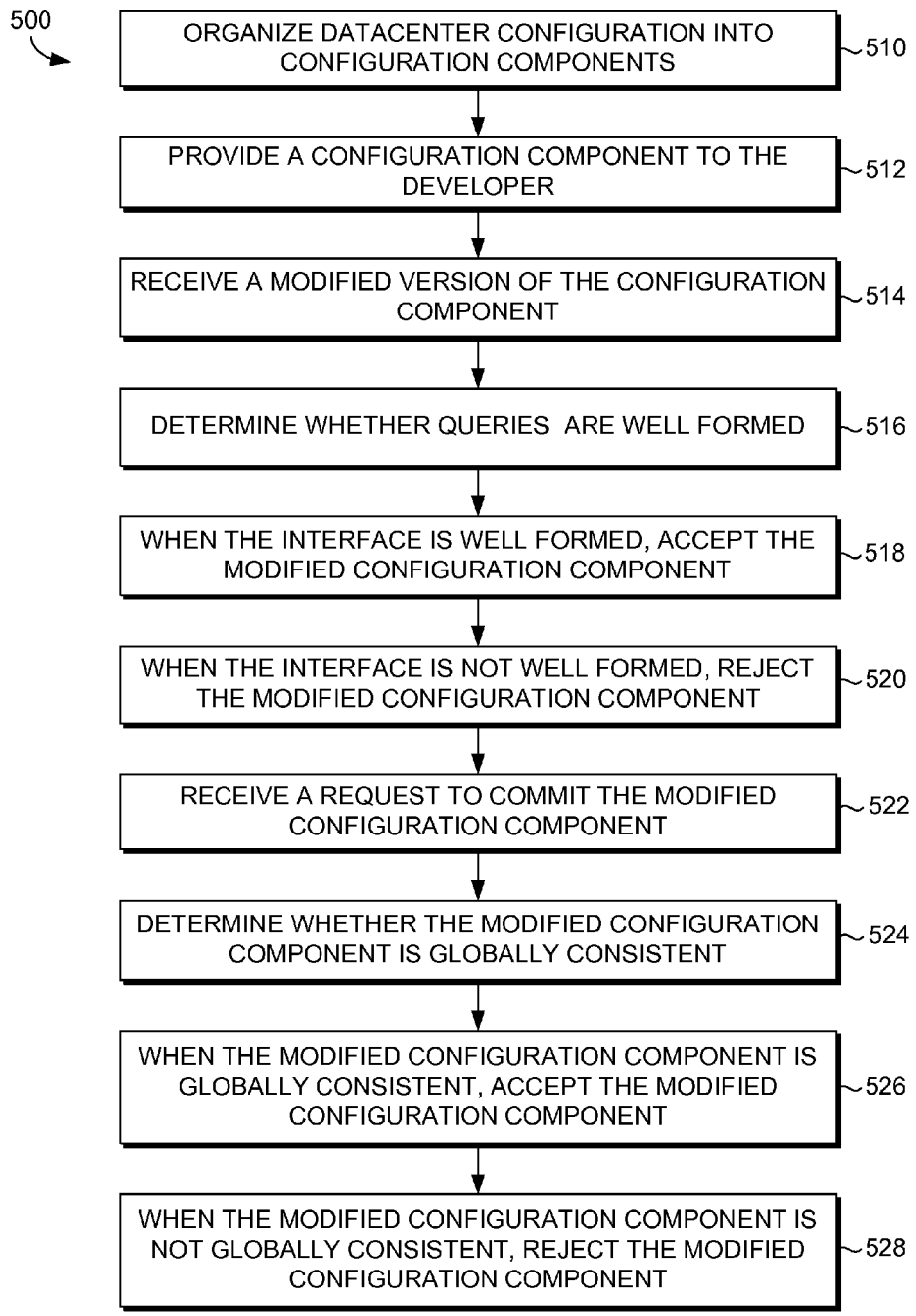
FIG. 5 depicts a method in accordance with an embodiment of the present invention.

Referring now to FIG. 5, a method is depicted in accordance with an embodiment of the present invention and is generally referred to as a method 500. Method 500 is but one example of a suitable method. At a step 510, datacenter configuration data is organized into configuration components that include configuration data that corresponds to aspects of the datacenter configuration.

At a step 512, a configuration component is provided to the developer, which enables the developer to modify the configuration component in an environment apart from the main configuration data. At a step 514, a modified version of the configuration component is received from the developer.

At a step 516, a determination is made as to whether queries defined by the interface are well formed, i.e., that the types of the values returned by the configuration component for every member in the interface are consistent with the interface declaration. At a step 518, when it is determined that queries are well formed, the modified configuration component is accepted into a managed set of datacenter configuration as a new exact version. At a step 520, when it is determined that queries are not well formed, the modified configuration component is rejected.

Assuming that the modified configuration component was accepted, a request is received from the developer at a step 522 for the new exact version to be committed. At a step 524, a determination is made as to whether the new exact version is globally consistent with the datacenter configuration. Any constraints that may have changed, or have been introduced, are evaluated against the new data to verify that global consistency is maintained.

At a step 526, when the new exact version is determined to be globally consistent, the request is accepted and the new exact version becomes the head exact version. At that point, any developer querying for data will receive the modified data. On the other hand, when the new exact version is determined not to be globally consistent, the request is rejected at a step 528.

In some embodiments, providing the configuration component to the developer at step 512 may include generating a partial branch of configuration data that includes the configuration component. The partial branch references the datacenter configuration that is not included in the partial branch, thus enabling the developer to validate that the changes to the component are consistent other portions of the datacenter configuration.

Figure 6:
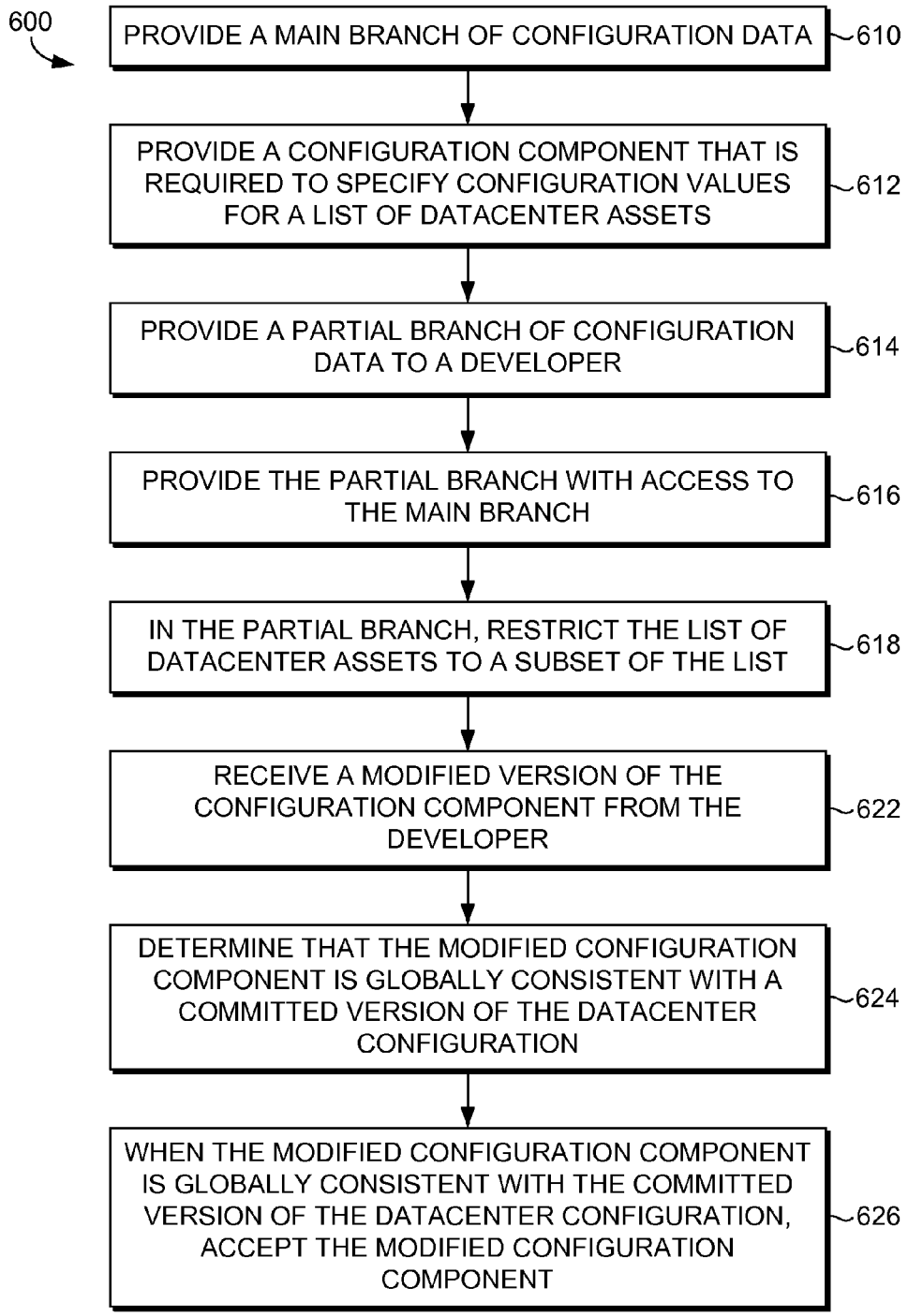
FIG. 6 depicts a method in accordance with an embodiment of the present invention.

Referring now to FIG. 6, a method is depicted in accordance with an embodiment of the present invention and is generally referred to as a method 600. Method 600 is but one example of a suitable method. At a step 610, a main branch of configuration data is provided that includes configuration data for a datacenter. At a step 612, a configuration component in the main branch is provided. The configuration component is a collection of configuration data that correspond to an aspect of the datacenter configuration. The configuration component is required to specify configuration values for a list of datacenter assets, and includes a dependency on other configuration components in the main branch.

At a step 614, a partial branch of configuration data is provided, or checked out, to a developer. The partial branch is a copy of a portion of the main branch and includes a copy of the configuration component. The copy of the configuration component in the partial branch is made available to the developer for modification. At a step 616, the partial branch is provided with access to the main branch, such that the dependency of the copy of the configuration component on the other configuration components is fulfilled without including the other configuration components in the partial branch.

At a step 618, the list of datacenter assets is restricted to a subset of the list. The configuration component in the partial branch is not required to specify configuration values for a datacenter asset in the list if the datacenter asset is not in the subset of the list. This is one function of a dynamic enum, as described above. In an embodiment, the restriction is explicit, and the verification includes checking the consistency of the data that is not included in the restricted enum.

At a step 622, a modified version of the configuration component is received, or checked in, from the developer. At a step 624, a determination is made that the modified configuration component is globally consistent with a committed version of the datacenter configuration. At a step 626, when the modified configuration component is determined to be globally consistent with the committed version of the datacenter configuration, the modified configuration component is accepted. The modified configuration component is then available for deployment by the same or other developers who request data from that branch. In the event that the changes are intended to become the default values for the datacenter, then they must be integrated into the main branch as well prior to the orchestrated commit.

Figure 7:
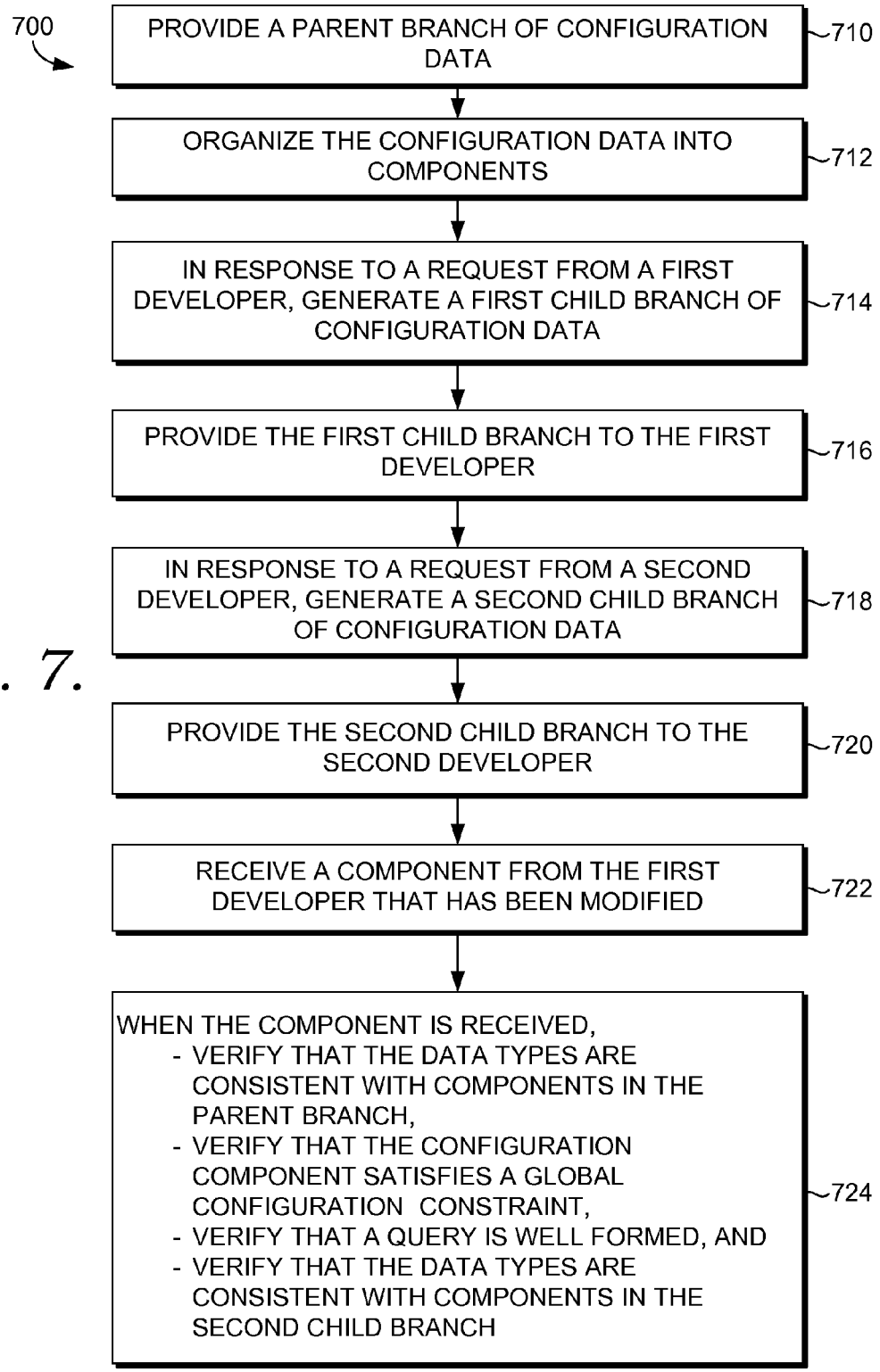
FIG. 7 depicts a method in accordance with an embodiment of the present invention.

Referring now to FIG. 7, a method is depicted in accordance with an embodiment of the present invention and is generally referred to as a method 700. Method 700 is but one example of a suitable method. At a step 710, a parent branch of configuration data that includes configuration data for the datacenter is provided. At a step 712, the configuration data is organized into components that include interfaces that enable one component to query another component for configuration settings. The data associated with the queries is required to conform to defined data types.

At a step 714, in response to a request from a first developer, a first child branch of configuration data is generated. The first child branch includes a first component that is a copy of a component in the parent branch. At a step 716, the first child branch is provided to the first developer. The first developer then is enabled to modify the first component.

At a step 718, in response to a request from a second developer, a second child branch of configuration data is generated. The second child branch includes a second component, wherein the second component is a copy of another component in the parent branch. At a step 720, the second child branch is provided to the second developer. At a step 722, a modified version of the first component is received from the developer. At a step 724, when the component is received, it is verified that (A) data types for data in the first component are consistent with components in the parent branch, (B) that the first component satisfies a global configuration constraint, (C) that a query associated with the first component is well formed, and (D) that the data types for the data in the first component are consistent with components in the second child branch.

FIGS. 8-12 illustrate a real-world example of component dependencies and how the dependencies relate to implementation of configuration changes, according to an embodiment of the present invention. In an embodiment, when customers run their applications in a datacenter, they are charged according to their usage of compute, storage, and network bandwidth. Network bandwidth usage is free if the connection is within the same datacenter as the application. However, if the network traffic goes outside of the datacenter, then the bandwidth usage results in a charge per gigabyte of data transferred. Furthermore, the charge varies depending on the geographic source and destination of the traffic. For example, bandwidth is more expensive in Asia than in North America. Therefore, if the source or destination is within a datacenter in Asia, the charge will be higher per gigabyte transferred.

In an embodiment, a bandwidth tracker measures bandwidth usage by applications running in the datacenter. In order to correctly classify the source and destination of the network traffic that it measures, the bandwidth tracker is programmed with a set of network ranges (i.e., IP address ranges). Each datacenter is listed, and for each datacenter, the set of IP addresses that are located in that datacenter is declared. This way, when the bandwidth tracker observes traffic flowing into or out of a hosted application, it can record the data necessary to generate the bandwidth-related charges on the customer's monthly bill.

The bandwidth tracker consumes the network ranges in a file called a machine configuration file (MCF). The MCF has a certain format, and the code of the bandwidth tracker knows how to consume the data in that format. If there is a change in that format, then the code of the bandwidth tracker must change in lockstep with the format change so that it can continue to make use of the MCF. The MCF contains various categories of data, including but not limited to the IP ranges. The values of the data fields in the MCF change to reflect changes in the set of physical assets located in datacenters and the policies that govern usage of those assets.

Network ranges are derived from a separate database that is administered by a network services group. The network services group is responsible for coordinating the purchasing and administration of all of the IP addresses used. The network services group updates this IP range database on its own schedule that is governed by budgeting and operational processes. There is no coordination between changes made in the IP range database and the periodic releases of the bandwidth tracker. However, whenever a new MCF is generated, it should contain the latest set of IP ranges to ensure billing accuracy.

Figure 8:
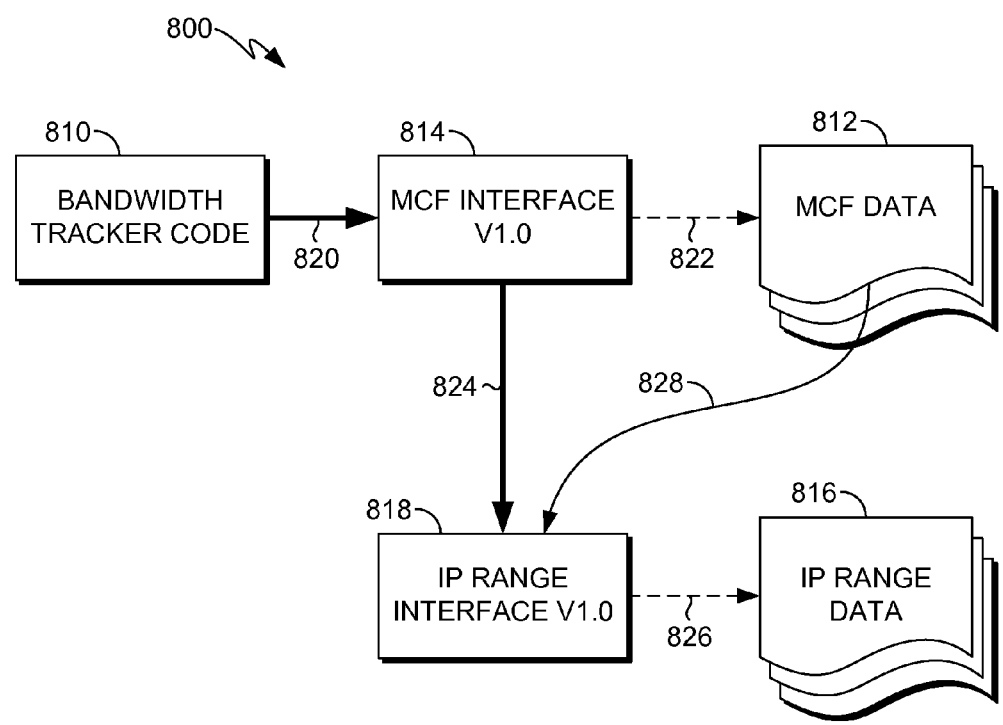
FIGS. 8-12 depict a datacenter configuration according to an embodiment of the present invention.

The above discussion describes two configuration dependencies, which are illustrated in FIG. 8. FIG. 8 depicts a datacenter configuration according to an embodiment of the present invention and is generally referred to as datacenter configuration 800. Datacenter configuration 800 includes bandwidth tracker code 810, MCF data 812, an MCF interface version 1.0 814, IP range data 816, and IP range interface version 1.0 818.

In an embodiment, as described above, MCF data 812 is one configuration artifact that depends on the data stored in a different configuration artifact, the network services IP range data 816. Furthermore, bandwidth tracker code 810 depends on the format of MCF data 812. Bandwidth tracker code 810 declares a dependency (bold arrow 820) on MCF interface version 1.0 814. That interface version describes the format of MCF data 812. MCF interface version 1.0 814, in turn, has been bound (dotted line 822) over time to several versions of MCF data 812. The contents of each version of MCF data 812 are different, but each version conforms to the format constraints in MCF interface version 1.0 814, ensuring that bandwidth tracker code 810 will be able to consume that data.

The MCF in turn depends (bold arrow 824) on IP range interface version 1.0 818, which is in turn bound (dotted line 826) over time to multiple versions of IP range data 816. MCF data 812 contains an embedded query 828 that automatically retrieves the most updated version of IP range data 816 from the IP range component, via a mechanism declared in IP range interface version 1.0 818. Even if IP range data 816 changes frequently, the query in MCF data 812 will always retrieve valid results in a format that it knows how to consume because IP range interface version 1.0 818 is consistent.

Since interface versions are consistent, the specific values of the data bound to those interface versions can change according to the distinct processes and schedules of the disparate owners of each category of data. At the same time, the consumers of the data need not do any work when those underlying values change because they rely only on the format declared in the interface version.

Figure 9:
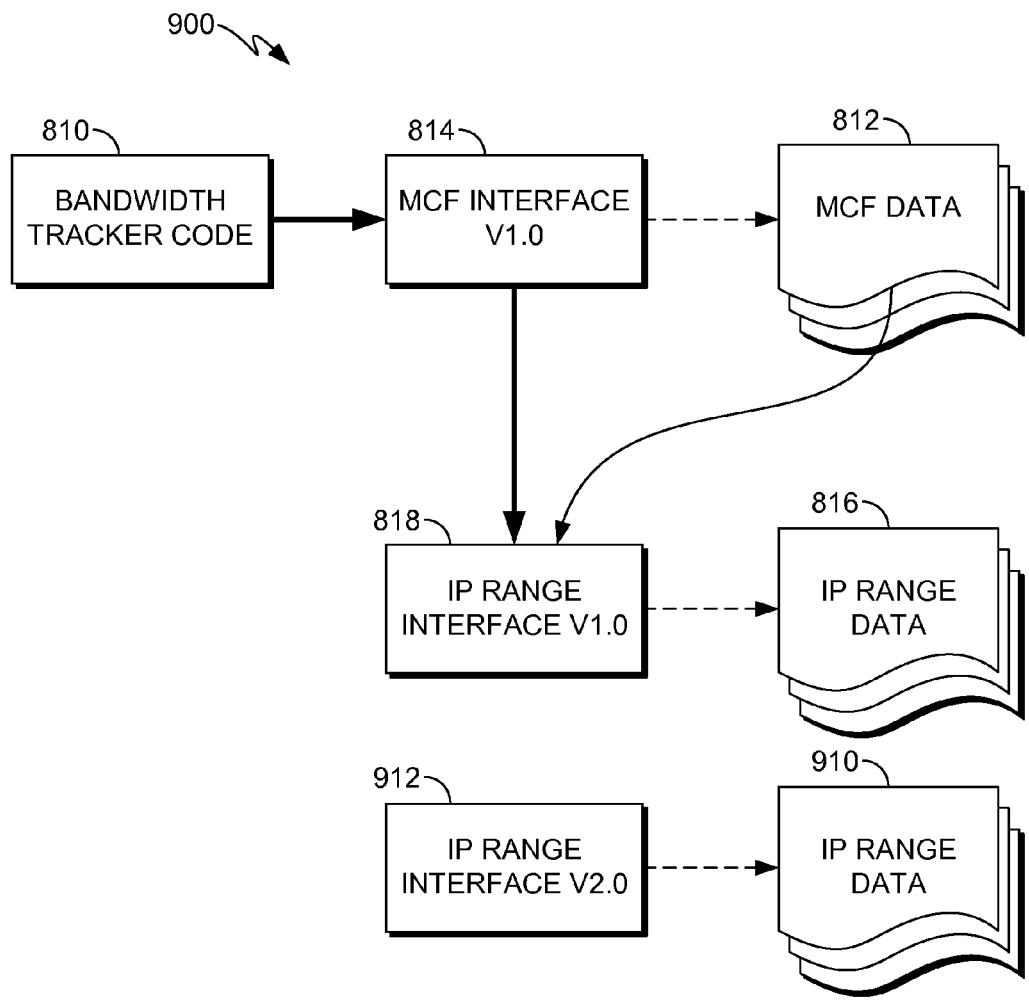

FIG. 9 is a block diagram depicting a datacenter configuration according to an embodiment of the present invention and is generally referred to as datacenter configuration 900. Datacenter configuration 900 includes bandwidth tracker code 810, MCF data 812, MCF interface version 1.0 814, IP range data 816, and IP range interface version 1.0 818, each of which is also depicted in FIG. 8. Datacenter configuration 900 further includes IP range data 910 and IP range interface version 2.0 912.

With reference to FIG. 9, in one embodiment, developers decide to switch the datacenter from using IPv4 protocols to IPv6 protocols. IP range data 816 would then need to have a new format. The developers would declare new IP Range interface version 2.0 912. Initially, it would sit side-by-side with the old version as depicted in FIG. 9.

Figure 10:
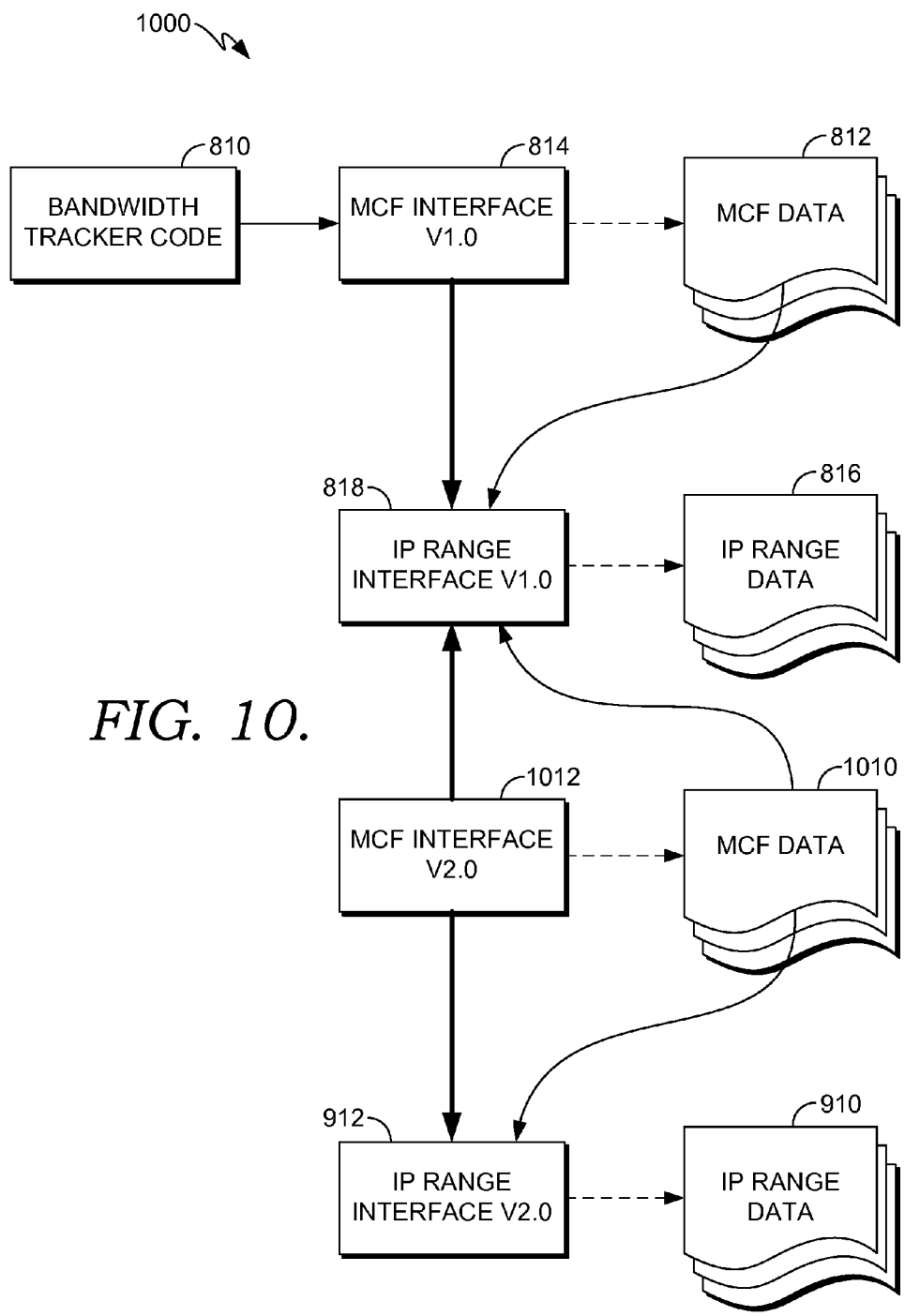

At that point, no components depend upon IP Range interface version 2.0 912. Eventually, when the team that owns MCF data 812 gets around to it, the MCF component might produce a new MCF interface version that exposes IPv6 network ranges in addition to IPv4 network ranges. Referring to FIG. 10, a block diagram depicts a datacenter configuration according to an embodiment of the present invention and is generally referred to as datacenter configuration 1000. Datacenter configuration 1000 includes, in addition to the items depicted in FIG. 9, MCF data 1010 and MCF interface version 2.0 1012.

Figure 11:
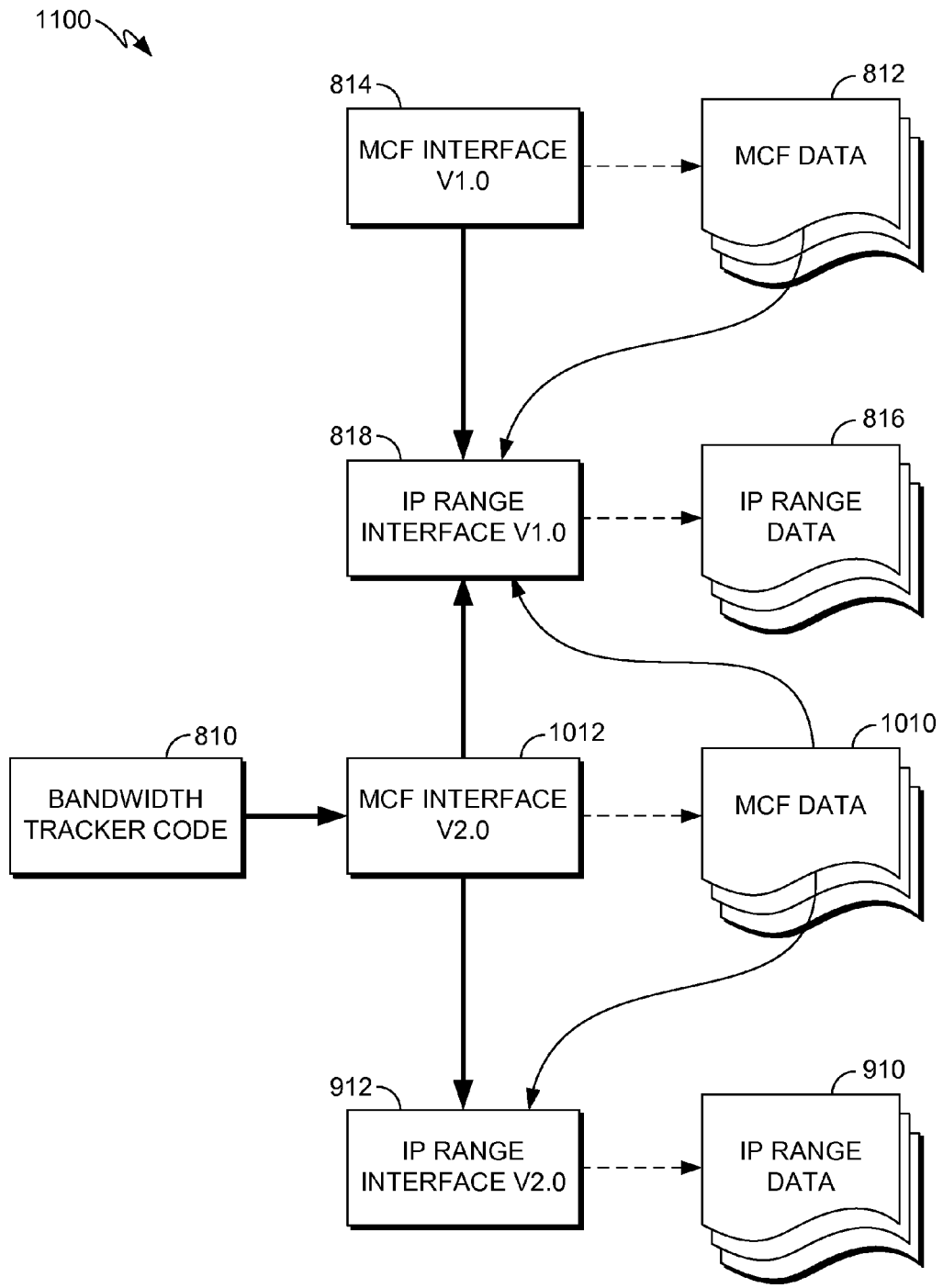

At some point, the developer team that owns the bandwidth tracker modifies bandwidth tracker code 810 so that it stops depending on the interface version of the MCF that only exposes IPv4 ranges (MCF interface version 1.0 814), and starts to depend on the MCF interface version that exposes IP ranges for both IPv4 and IPv6 (MCF interface version 2.0 1012). This is depicted in FIG. 11. Referring to FIG. 11, a block diagram depicts a datacenter configuration according to an embodiment of the present invention and is generally referred to as datacenter configuration 1100. Datacenter configuration 1100 includes the items depicted in FIG. 10, except that bandwidth tracker code 810 is depicted as depending on MCF interface version 2.0 1012 instead of MCF interface version 1.0 814, as a result of having been modified by the developer team.

Figure 12:
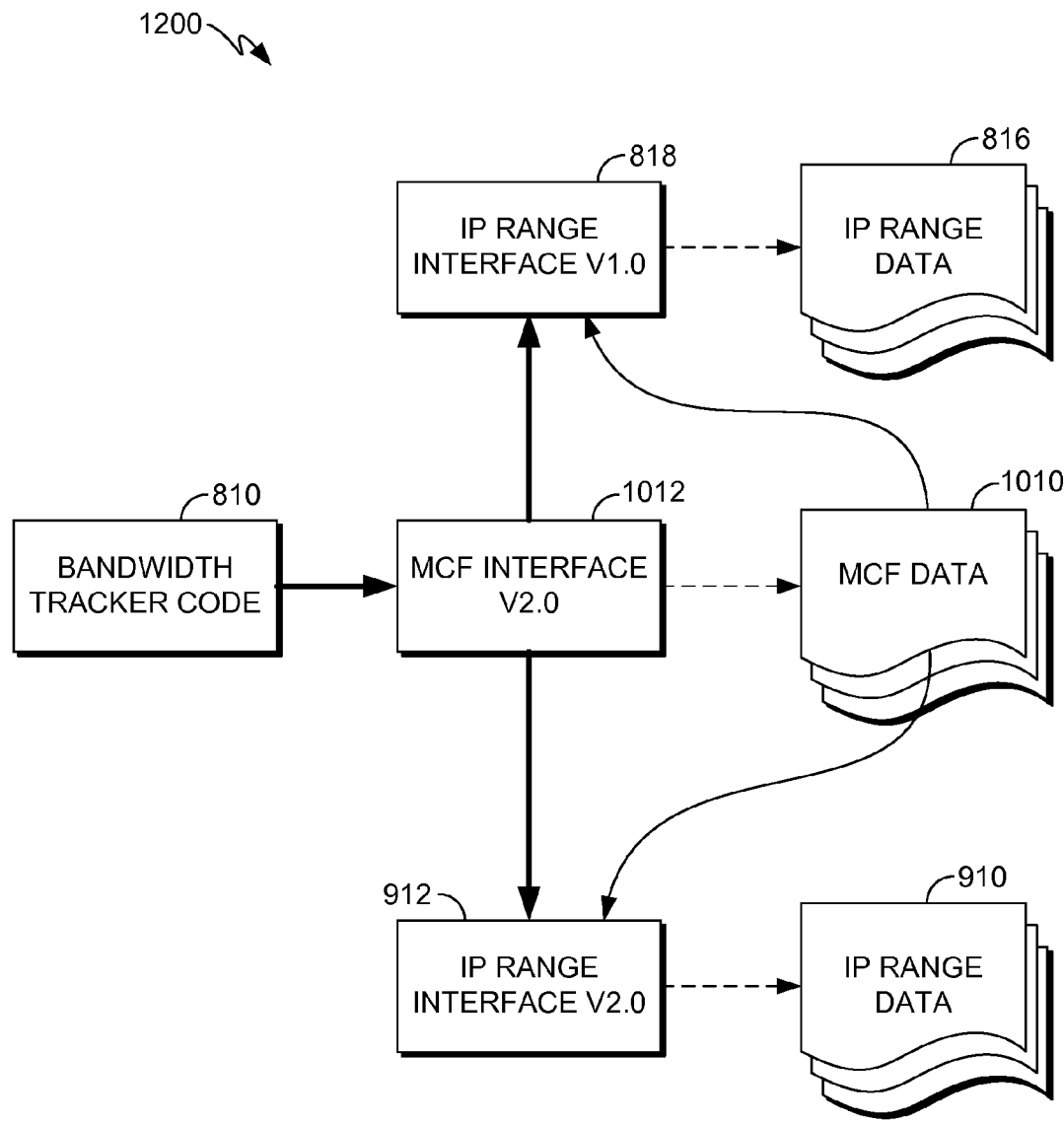

In an embodiment, in order to reduce their maintenance burden, the team responsible for the MCF might retire MCF interface version 1.0, as depicted in FIG. 12. Referring to FIG. 12, a block diagram depicts a datacenter configuration according to an embodiment of the present invention and is generally referred to as datacenter configuration 1200. Datacenter configuration 1200 includes the items depicted in FIG. 11, except for MCF interface version 1.0 814 and its bound data (MCF data 812), as a result of having been retired by the team responsible for the MCF.

The above example illustrates several points:

A) Because different categories of data are maintained by different teams according to different processes and schedules, it is convenient to factor configuration into separate configuration components that can be maintained independently;

B) configuration components can depend upon each other, and code can also depend on a configuration component;

C) a consistent, explicitly declared set of dependencies between interface versions can insulate different components (and the teams of people responsible for maintaining them) from format changes in the data that they depend upon while still allowing the underlying data (or values) to change at any point in time;

D) the introduction of new interface versions allows gradual incorporation of format changes in such a way that no consumers are broken by the changes; and E) when an interface version is no longer depended upon by any components, it can be retired and no longer needs to be maintained.

Many different arrangements of the various components depicted, as well as components not shown, are possible without departing from the scope of the claims below. Our technology has been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more hardware devices having computer-executable instructions embodied thereon that, when executed, perform a method of updating a datacenter configuration, the method comprising:

organizing the datacenter configuration into configuration components, wherein the configuration components are collections of configuration data that correspond to aspects of the datacenter configuration, and wherein each configuration component includes a versioned interface, wherein for a given configuration component, each version of the interface defines one or more configuration settings available for query by a consumer of the configuration component, and wherein each version of the interface defines one or more data types associated with configuration settings that are returned as a result of a query;

providing a first configuration component to a developer, wherein the first configuration component is available to the developer for modification apart from the datacenter configuration;

receiving a modified first configuration component from the developer, wherein the modified first configuration component is a modified version of the first configuration component;

determining whether an interface of the modified first configuration component is well formed, wherein the determining includes determining whether data types for configuration values returned by the modified first configuration component are consistent with the one or more configuration settings as defined in the interface of the first configuration component;

when the interface is well formed, accepting the modified first configuration component into a managed set of datacenter configuration, wherein the modified first configuration component is available for deployment, receiving a request to commit the modified first configuration component, determining whether the modified first configuration component is globally consistent with a committed version of the datacenter configuration, when the modified first configuration component is globally consistent with the committed version of the datacenter configuration, accepting the modified first configuration component into a managed set of datacenter configuration, wherein the modified first configuration component is available for deployment by another developer, and when the modified first configuration component is not globally consistent with the committed version of the datacenter configuration, rejecting the modified first configuration component;

when the modified first configuration component is not well formed, rejecting the modified first configuration component.

2. The one or more hardware devices of claim 1, wherein an aspect is one of a physical asset, a logical asset, or a policy.

3. The one or more hardware devices of claim 1, the method further comprising generating a partial branch of configuration data, wherein the partial branch includes the first configuration component, wherein the partial branch references the datacenter configuration that is not included in the partial branch, and wherein the first configuration component is provided to the developer by providing the partial branch to the developer.

4. The one or more hardware devices of claim 1, wherein determining whether the modified first configuration component is globally consistent with the committed version of the datacenter configuration includes determining whether the modified first configuration component satisfies a configuration constraint that is enforced across configuration components.

5. The one or more hardware devices of claim 1, wherein determining whether the modified first configuration component is globally consistent with a committed version of the datacenter configuration includes determining whether a data type of data that is bound to the first configuration component interface is consistent with configuration components that share dependencies with the first configuration component.

6. The one or more hardware devices of claim 1, the method comprising generating a second partial branch that includes a set of configuration components that constitute a preserved version of configuration data, wherein the set of configuration components is maintained as a version-specific partial branch, wherein the version-specific partial branch is required to be consistent with configuration components in a current version of the parent branch.

7. The one or more hardware devices of claim 6, wherein when the preserved version is deployed, the preserved version is consistent with other versions of configuration data that have moved forward or backward independently of the preserved version.

8. One or more hardware devices having computer-executable instructions embodied thereon that, when executed, perform a method of updating datacenter configuration data, the method comprising:

providing a main branch of configuration data that includes the datacenter configuration data;

providing a configuration component, wherein the configuration component is included in the main branch, wherein the configuration component is a collection of configuration data that correspond to an aspect of datacenter configuration, wherein the configuration component is required to specify configuration values for a list of datacenter assets, and wherein the configuration component includes a dependency on other configuration components in the main branch;

providing a partial branch of configuration data to a developer, wherein the partial branch is a copy of a portion of the main branch, wherein the partial branch includes a copy of the configuration component, and wherein the copy of the configuration component is available to the developer for modification;

providing the partial branch with access to the main branch, wherein a dependency of the copy of the configuration component on the other configuration components in the main branch is fulfilled during development without including the other configuration components in the partial branch;

in the partial branch, restricting the list of datacenter assets to a subset of the list of datacenter assets, wherein the configuration component in the partial branch is not required to specify configuration values for a datacenter asset in the list of datacenter assets if the datacenter asset is not in the restricted list;

receiving a modified configuration component from the developer, wherein the modified configuration component is a modified version of the configuration component;

prior to accepting the modified configuration component into a managed set of datacenter configuration, determining that the modified configuration component is globally consistent with a committed version of the datacenter configuration, wherein determining that the modified configuration component is globally consistent with the committed version of the datacenter configuration includes verifying that the modified configuration component is consistent with datacenter assets that are not in the restricted list; and when the modified configuration component is globally consistent with the committed version of the datacenter configuration, accepting the modified configuration component into the managed set of datacenter configuration, wherein the modified configuration component is available for deployment.

9. The one or more hardware devices of claim 8, wherein the configuration component includes an interface that defines one or more configuration-setting queries available to a consumer of the configuration component, wherein the interface defines one or more data types associated with one or more named configuration settings.

10. The one or more hardware devices of claim 8, wherein modifications to the partial branch by the developer are isolated from the datacenter configuration data.

11. The one or more hardware devices of claim 8, wherein the aspect is one of at least a physical asset, a logical asset, and a policy.

12. The one or more hardware devices of claim 8, wherein determining that the modified configuration component is globally consistent with the committed version of the datacenter configuration includes verifying that the modified configuration component is consistent with a configuration component in a second partial branch.

13. The one or more hardware devices of claim 12, wherein each component is a collection of configuration data that correspond to an aspect of the datacenter configuration.

14. The one or more hardware devices of claim 13, wherein the aspect is one of at least a physical asset, a logical asset, and a policy.

15. One or more hardware devices having computer-executable instructions embodied thereon that, when executed, perform a method of managing independent, simultaneous modifications to configuration data of a datacenter, the method comprising:

providing a parent branch of configuration data that includes configuration data for the datacenter;

organizing the configuration data into components, wherein the components include versioned interfaces that enable one component to query another component for configuration settings, wherein data associated with the queries conforms to data types, wherein for each component, each version of the included interface defines one or more queries for configuration settings and one or more data types associated with the configuration settings for that version of the interface;

in response to a request from a first developer, generating a first child branch of configuration data, wherein the first child branch includes a first component, wherein the first component is a copy of a component in the parent branch, and wherein modifications to the first component in the child branch do not affect the parent branch;

providing the first child branch to the first developer, wherein the first developer is enabled to modify the first component;

in response to a request from a second developer, generating a second child branch of configuration data, wherein the second child branch includes a second component, wherein the second component is a copy of another component in the parent branch;

providing the second child branch to the second developer, wherein the second developer is enabled to modify the second component;

receiving the first component from the first developer for integration into the parent branch, wherein the first component has been modified; and upon receiving the modified first component, and prior to integrating the modified first component into the parent branch, (1) verifying that data types for data in the modified first component are consistent with components in the parent branch, (2) verifying that the modified first component satisfies a global configuration constraint, and (3) verifying that a query associated with the modified first component is well formed, and (4) verifying that the data types for the data in the modified first component are consistent with components in the second child branch.

16. The one or more hardware devices of claim 15, wherein verifying that the data types are consistent with components in the parent branch includes verifying that the data types across upstream components are consistent.

17. The one or more hardware devices of claim 15, wherein verifying that a query is well formed includes verifying that the types of the values that the query returns for every configuration setting in the interface are consistent with an interface declaration.

* * * * *